United States Patent
Coppinger et al.

(10) Patent No.: US 8,082,546 B2
(45) Date of Patent: Dec. 20, 2011

(54) JOB SCHEDULING TO MAXIMIZE USE OF REUSABLE RESOURCES AND MINIMIZE RESOURCE DEALLOCATION

(75) Inventors: Richard J. Coppinger, Milton, NY (US); Alexander Druyan, Brooklyn, NY (US)

(73) Assignee: International Business Machines Corporation, Armonk, NY (US)

(*) Notice: Subject to any disclaimer, the term of this patent is extended or adjusted under 35 U.S.C. 154(b) by 1475 days.

(21) Appl. No.: 11/537,429

(22) Filed: Sep. 29, 2006

(65) Prior Publication Data

US 2008/0082979 A1  Apr. 3, 2008

(51) Int. Cl.
G06F 9/46 (2006.01)
G06F 15/173 (2006.01)

(52) U.S. Cl. ........ 718/104; 718/103; 718/105; 709/223; 709/224; 709/225; 709/226

(58) Field of Classification Search .................. 718/102, 718/103, 104, 105; 709/223, 226
See application file for complete search history.

(56) References Cited

U.S. PATENT DOCUMENTS

| | | | |
|---|---|---|---|
| 6,216,109 B1 | 4/2001 | Zweben et al. | 705/8 |
| 6,233,630 B1 | 5/2001 | Wilhelm, Jr. | 710/56 |
| 6,278,901 B1 | 8/2001 | Winner et al. | 700/99 |
| 6,546,364 B1 | 4/2003 | Smirnov et al. | 703/22 |
| 6,651,081 B1 * | 11/2003 | Salgado et al. | 718/103 |
| 6,687,857 B1 * | 2/2004 | Iwata et al. | 714/38 |
| 7,111,297 B1 * | 9/2006 | Sankaranarayan et al. | 718/104 |
| 7,299,469 B2 * | 11/2007 | Hamilton et al. | 718/104 |
| 7,562,143 B2 * | 7/2009 | Fellenstein et al. | 709/226 |
| 2002/0023118 A1 * | 2/2002 | Peled et al. | 709/104 |
| 2002/0082856 A1 * | 6/2002 | Gray et al. | 705/1 |
| 2002/0198886 A1 | 12/2002 | Ramakrishnan | 707/100 |
| 2003/0191795 A1 * | 10/2003 | Bernardin et al. | 709/105 |
| 2004/0117046 A1 | 6/2004 | Colle et al. | 700/99 |
| 2004/0158568 A1 | 8/2004 | Colle et al. | 707/100 |
| 2004/0230974 A1 * | 11/2004 | Hamilton et al. | 718/100 |
| 2005/0044205 A1 * | 2/2005 | Sankaranarayan et al. | 709/223 |
| 2006/0101104 A1 | 5/2006 | Bhanot et al. | 708/105 |

OTHER PUBLICATIONS

"An Overview of the Blue Gene/L Super Computer," 0-7695-1524-X/02, 2002, IEEE, pp. 1-22.

* cited by examiner

*Primary Examiner* — Jennifer To
(74) *Attorney, Agent, or Firm* — Steven Chiu; Heslin Rothenberg Farley & Mesiti P.C.

(57) ABSTRACT

Jobs are scheduled such that resource reuse is maximized and deallocation of reusable resources is minimized. A multiphase scheduling capability is provided in which during a first phase, weights are assigned to the reusable resources, and during a second phase, the jobs are scheduled. If reusable resources are available for the job, the job is assigned to those resources. Otherwise, a search is performed for a solution which minimizes the weight and number of reusable resources that are to be deallocated.

20 Claims, 7 Drawing Sheets

JOB SCHEDULING TO MAXIMIZE USE OF REUSABLE RESOURCES AND MINIMIZE RESOURCE DEALLOCATION

TECHNICAL FIELD

This invention relates, in general, to scheduling jobs within a processing environment, and in particular, to scheduling jobs such that the use of reusable resources is maximized, while the deallocation of reusable resources is minimized.

BACKGROUND OF THE INVENTION

A processing environment has a finite number of resources to be used in scheduling jobs to be executed within the processing environment. In some environments, there are significant costs associated with allocating and deallocating resources used by the jobs, while there are relatively minor costs associated with reusing those resources without deallocating/reallocating the resources. One example of such an environment is the Blue Gene system, offered by International Business Machines Corporation, Armonk, N.Y.

In the Blue Gene system, jobs are scheduled to execute on entities called blocks. The operation of allocating a block involves physically booting the underlying Blue Gene hardware associated with the block. This is a costly operation that can take several minutes to complete. Similarly, deallocating a block involves shutting down the associated Blue Gene hardware and it is also costly. Reusing the block, on the other hand, is relatively inexpensive compared to the allocation/deallocation costs.

It is not always possible, however, to reuse a block, since blocks do not always match resource requirements of jobs being scheduled. When scheduling a job, it can either execute on a reusable block, if it matches the job's resource requirements or on a new block. In some cases, there are not enough resources available to allocate a new block. In these cases, it is necessary to deallocate some reusable blocks in order to make room for a new block to be allocated.

Currently, there are techniques used for deallocating resources and for scheduling jobs using those resources. However, those techniques are inefficient and costly.

SUMMARY OF THE INVENTION

Based on the foregoing, a need exists for a capability that efficiently determines which resources are to be reused and which are to be deallocated to schedule a job. In particular, a need exists for a job scheduling capability that maximizes the use of reusable resources and minimizes deallocation of resources.

The shortcomings of the prior art are overcome and additional advantages are provided through the provision of a computer implemented method of scheduling jobs in a processing environment. The method includes, for instance, assigning a plurality of weights to a plurality of reusable resources, wherein the assigning of a weight to a reusable resource is based upon a selected criteria; determining whether one or more reusable resources of the plurality of reusable resources usable in scheduling a selected job are available for the selected job; assigning the selected job to the one or more reusable resources, in response to the determining indicating the one or more reusable resources are available for the selected job; and deallocating, in response to the determining indicating unavailability, at least one reusable resource of the plurality of reusable resources to provide the one or more reusable resources usable in scheduling the selected job, wherein the deallocating comprises selecting the at least one reusable resource to be deallocated from the plurality of reusable resources based on a consideration of at least one of one or more assigned weights of one or more reusable resources and minimizing how many reusable resources are to be deallocated.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a scheduling capability is provided in which the use of reusable resources is maximized and the deallocation of resources is minimized. A multi-phase scheduling capability is used, in which during a first phase, weights are assigned to the reusable resources based upon, for instance, the priority of jobs that can use the corresponding resources; and in a second phase, the jobs are scheduled. In scheduling the jobs, if reusable resources are available for the job, the job is assigned to those resources. Otherwise, a search is performed for a solution which minimizes the weight and number of reusable resources that need to be deallocated. Reusable resources that interfere with a chosen solution are deallocated and the job is assigned to the resources of the chosen solution.

The scheduling capability of one or more aspects of the present invention is usable in many types of processing environments, including, for instance, massively parallel systems that execute parallel jobs requiring a large number of resources (e.g., processors). One example of such an environment is the Blue Gene system, offered by International Business Machines Corporation, Armonk, N.Y. Aspects of this system are described in, for instance, U.S. Patent Application Publication No. US 2006/0101104, entitled "Optimizing Layout Of An Application On A Massively Parallel Super Computer," published May 11, 2006, and in an article entitled "An Overview of the Blue Gene/L Super Computer," 0-7695-1524-X/02, 2002, IEEE, pp. 1-22, each of which is hereby incorporated herein by reference in its entirety.

Figure 1:
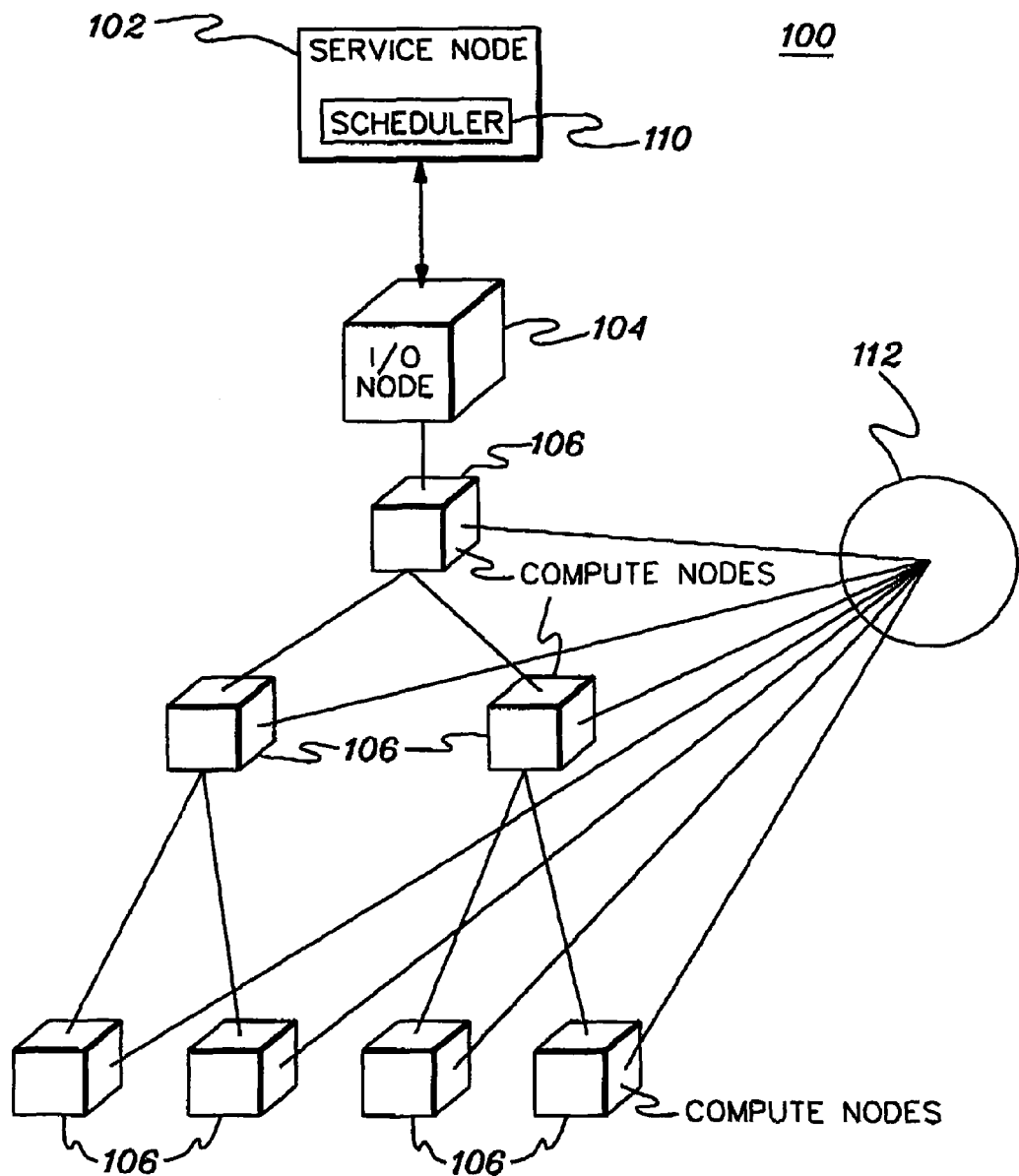
FIG. 1 depicts one embodiment of a processing environment incorporating and using one or more aspects of the present invention.

Further details of one embodiment of a massively parallel processing environment to incorporate and use one or more aspects of the present invention are described with reference to FIG. 1. A processing environment 100 includes, for instance, a service node 102 coupled to one or more I/O nodes 104, which are further coupled to a plurality of compute nodes 106.

Service node 102 provides services to the I/O and compute nodes, and in one embodiment, includes a scheduler 110 used in scheduling jobs on the compute nodes. In particular, scheduler 110 includes the logic used in scheduling the jobs.

The one or more I/O nodes 104 are used to facilitate communications between the service node and compute nodes. In one example, the one or more I/O nodes and the compute nodes are coupled into a large network via, for instance, a 100 Mbs Ethernet network 112.

Compute nodes 106 are used to execute the jobs scheduled by scheduler 110. The compute nodes are, in this example, the resources assigned to the jobs. The compute nodes can be any type of computing or processing nodes, including LINUX servers, other servers or other types of computing nodes or processing nodes.

To efficiently schedule jobs on the compute nodes, scheduler 110 uses a multi-phase scheduling technique, in accordance with an aspect of the present invention. Specifically, during a first phase, weights are assigned to the reusable resources of the processing environment based, for instance, upon the priority of jobs that can use the resources; and in a second phase, the jobs are scheduled. The jobs are scheduled, in one embodiment, such that resource reuse is maximized by the highest priority jobs and deallocation of reusable resources is minimized. Further details regarding the scheduling of jobs are described with reference to FIGS. 2-4. The logic of these figures is executed by the scheduler, in one example.

Figure 2:
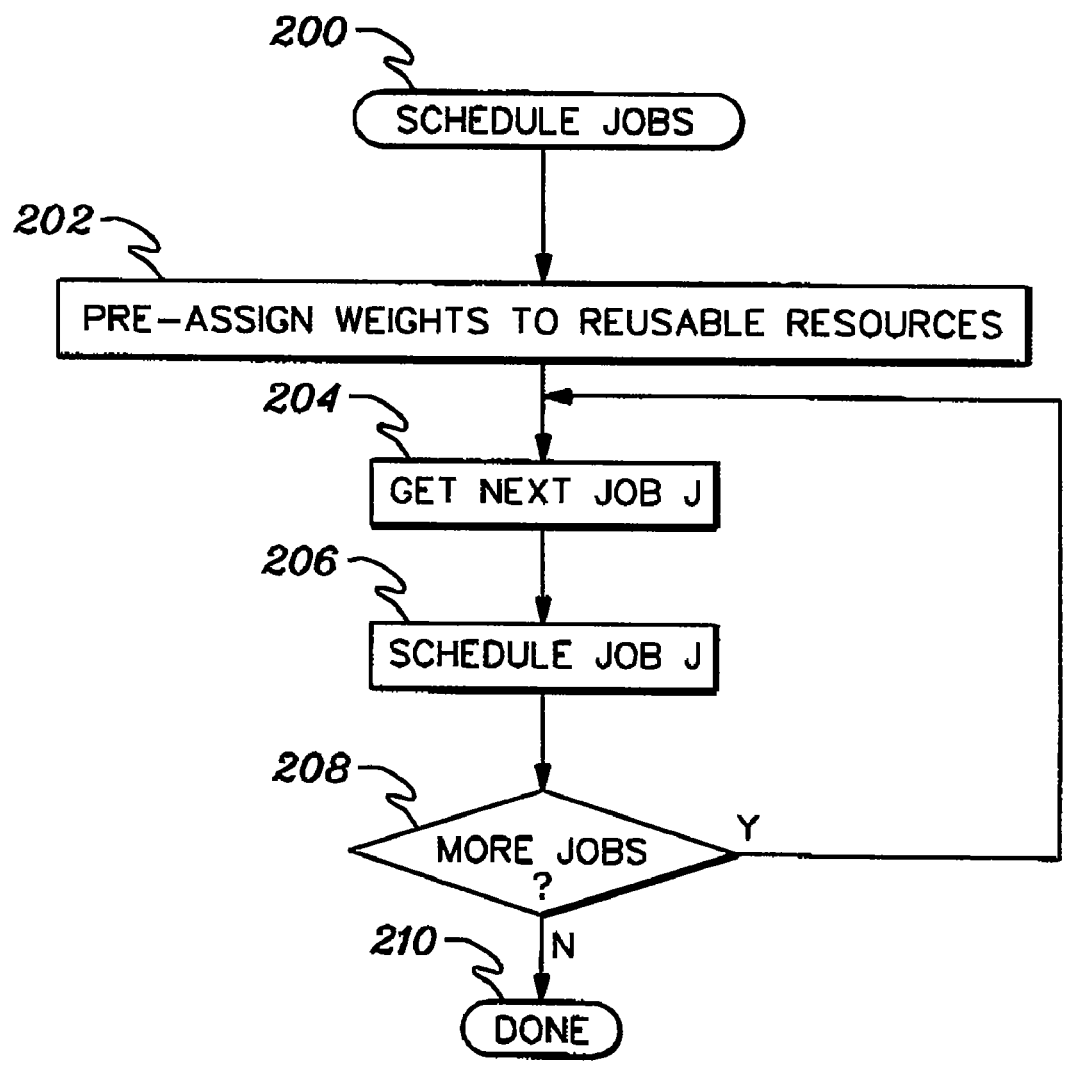
FIG. 2 depicts one example of an overview of the logic associated with scheduling jobs, in accordance with an aspect of the present invention.

Referring initially to FIG. 2, an overview of the scheduling technique used in accordance with an aspect of the present invention is described. In one example, this scheduling technique receives as an argument a list of jobs that are to be scheduled, STEP 200. This list of jobs is in priority order, in one example, with the highest priority jobs listed first. In response to receiving this list of jobs, weights (e.g., integers) are assigned to one or more reusable resources of the environment (e.g., reusable compute nodes) based on, for instance, the priority of the jobs that can use the resources, STEP 202. This is described in further detail below with reference to FIGS. 3A-3B. Thereafter, a job is selected from the list of jobs to be scheduled, STEP 204. In one example, the highest priority job is selected, and that job is scheduled, STEP 206, as described with reference to FIGS. 4A-4B. A determination is made as to whether there are more jobs to be scheduled, INQUIRY 208. If there are more jobs to be scheduled, processing continues with STEP 204. Otherwise, the scheduling technique is complete, STEP 210.

Figure 3A:
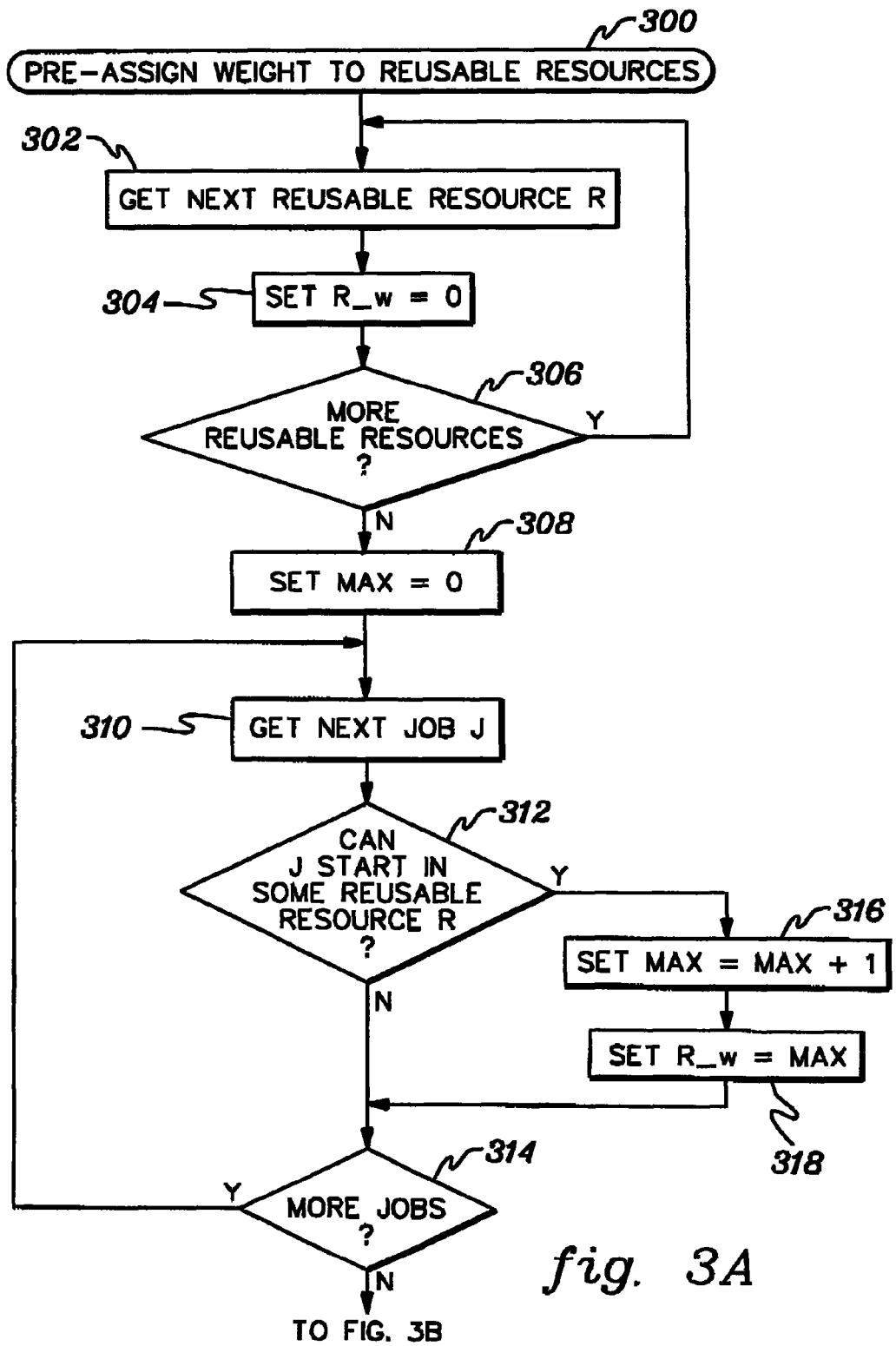
FIGS. 3A-3B depict one embodiment of the logic associated with a phase of job scheduling that includes pre-assigning weights to reusable resources, in accordance with an aspect of the present invention.
Figure 3B:
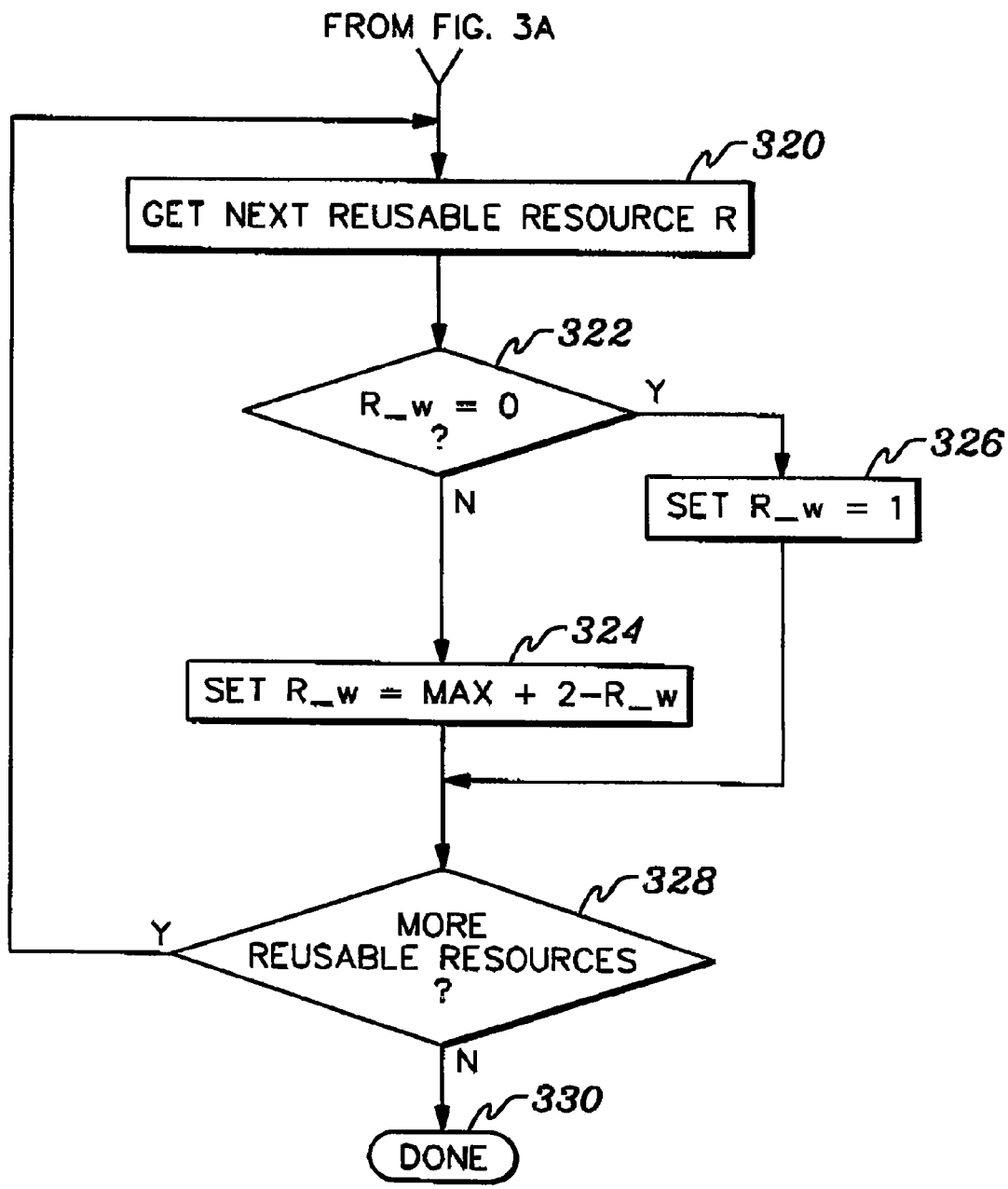

With reference to FIGS. 3A-3B, the pre-assigning of weights to reusable resources is further described. Referring to FIG. 3A, initially, the weight pre-assign heuristic receives as an argument a list of jobs to be scheduled and a list of reusable resources that are assignable to one or more of the jobs, STEP 300. A resource is then selected from the list of reusable resources, STEP 302, and the weight of the reusable resource (R_w) is initialized to zero. Thereafter, a determination is made as to whether there are more reusable resources to be initialized, INQUIRY 306. If there are additional reusable resources to be initialized, processing continues with STEP 302. Otherwise, processing continues with initializing a variable, referred to as max, to zero, STEP 308. Max is the total number of jobs pre-assigned to use reusable resources.

Thereafter, a highest priority job J is selected from the list of jobs that are to be pre-assigned, STEP 310. A determination is made as to whether job J can start in some reusable resource R (e.g., a set of one or more compute nodes), INQUIRY 312. In particular, a decision is made as to whether there is an unassigned reusable resource R with R_w equal to zero which can be used for job J. If there is such a resource, then max is incremented by one, STEP 316, and the weight of the reusable resource is set to max, STEP 318. Thereafter, or if job J cannot start in some reusable resource R, a determination is made as to whether there are more jobs to be processed, INQUIRY 314. If there are more jobs, processing continues with STEP 310. Otherwise, processing continues with STEP 320 (FIG. 3B).

At STEP 320, a reusable resource R is selected from the list of reusable resources, STEP 320. An inquiry is made as to whether the weight R_w of that resource is zero, INQUIRY 322. If the weight is not zero, then the weight of that resource is set, R_w=max+2−R_w. STEP 324. However, if the weight of the resource is zero, then the weight is set equal to one, STEP 326. After setting the weight of the resource, a determination is made as to whether there are more reusable resources, INQUIRY 328. If there are additional resources, processing continues with STEP 320. Otherwise, the pre-assigning of weights to reusable resources is complete, STEP 330.

After pre-assigning the weights to the reusable resources, each job to be scheduled is scheduled. Further details regarding the scheduling of a job are described with reference to FIGS. 4A-4B.

Figure 4A:
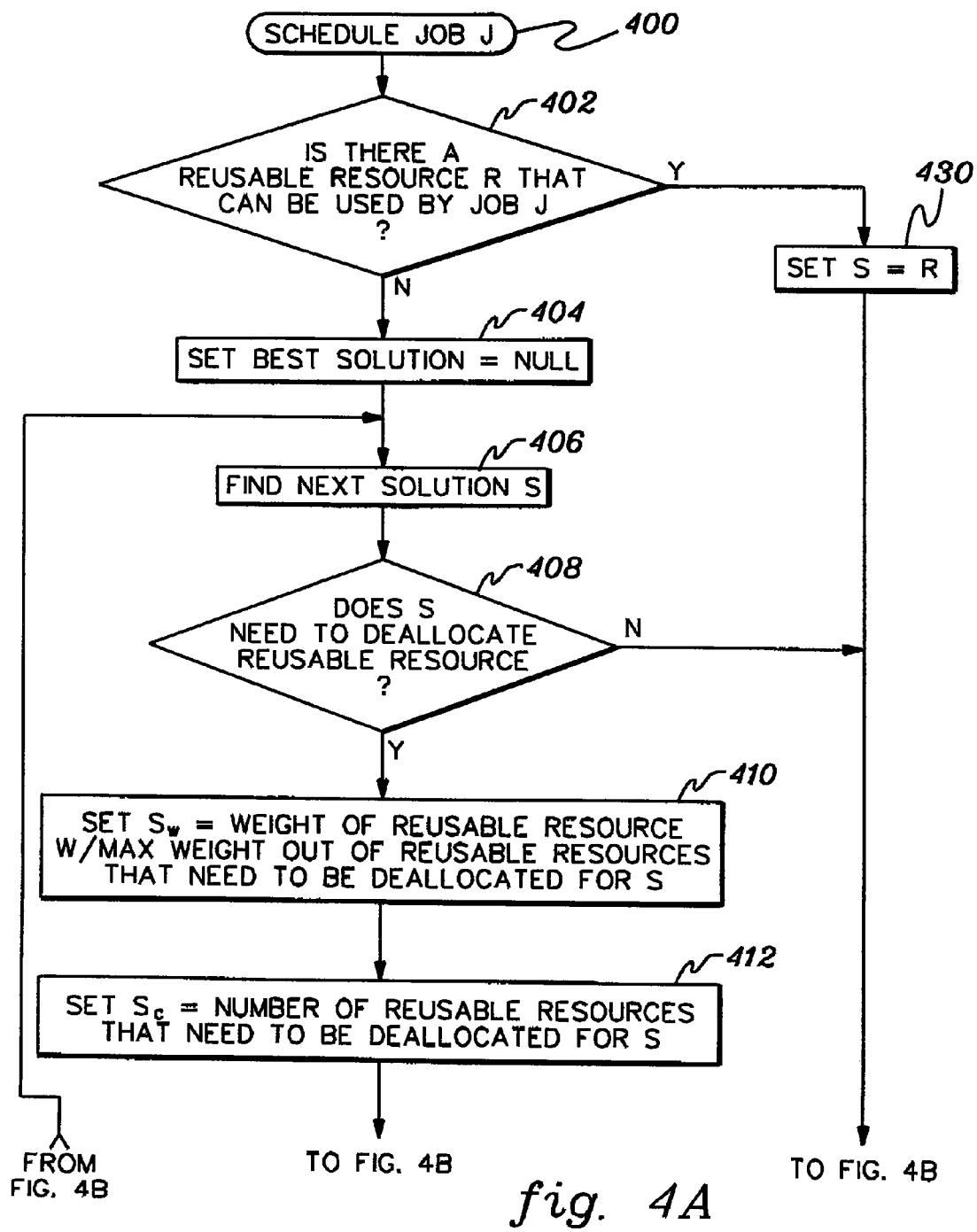
FIGS. 4A-4B depict one example of further details associated with scheduling a job, in accordance with an aspect of the present invention.

Referring to FIG. 4A, in scheduling job J, STEP 400, a determination is made as to whether there is some reusable resource R which can be used by job J, INQUIRY 402. For example, if the job requires 500 compute nodes, this inquiry determines whether there is a reusable resource with 500 compute nodes available. If there is no such reusable resource available for the job, then a best scheduling solution for job J is set to null, STEP 404, and a next solution S is found that can be used to schedule job J, STEP 406. A solution is one which defines resources to be used by the job. It may include one or more reusable resources that need to be deallocated.

Thereafter, a determination is made as to whether any reusable resources are to be deallocated for solution S, INQUIRY 408. If one or more of the resources are to be deallocated, then out of the reusable resources that need to be deallocated for S, the one with the maximal weight is chosen and a variable Sw is set to that weight, STEP 410. Further, a variable Sc is set to the number of reusable resources that are to be deallocated for S, STEP 412.

Figure 4B:
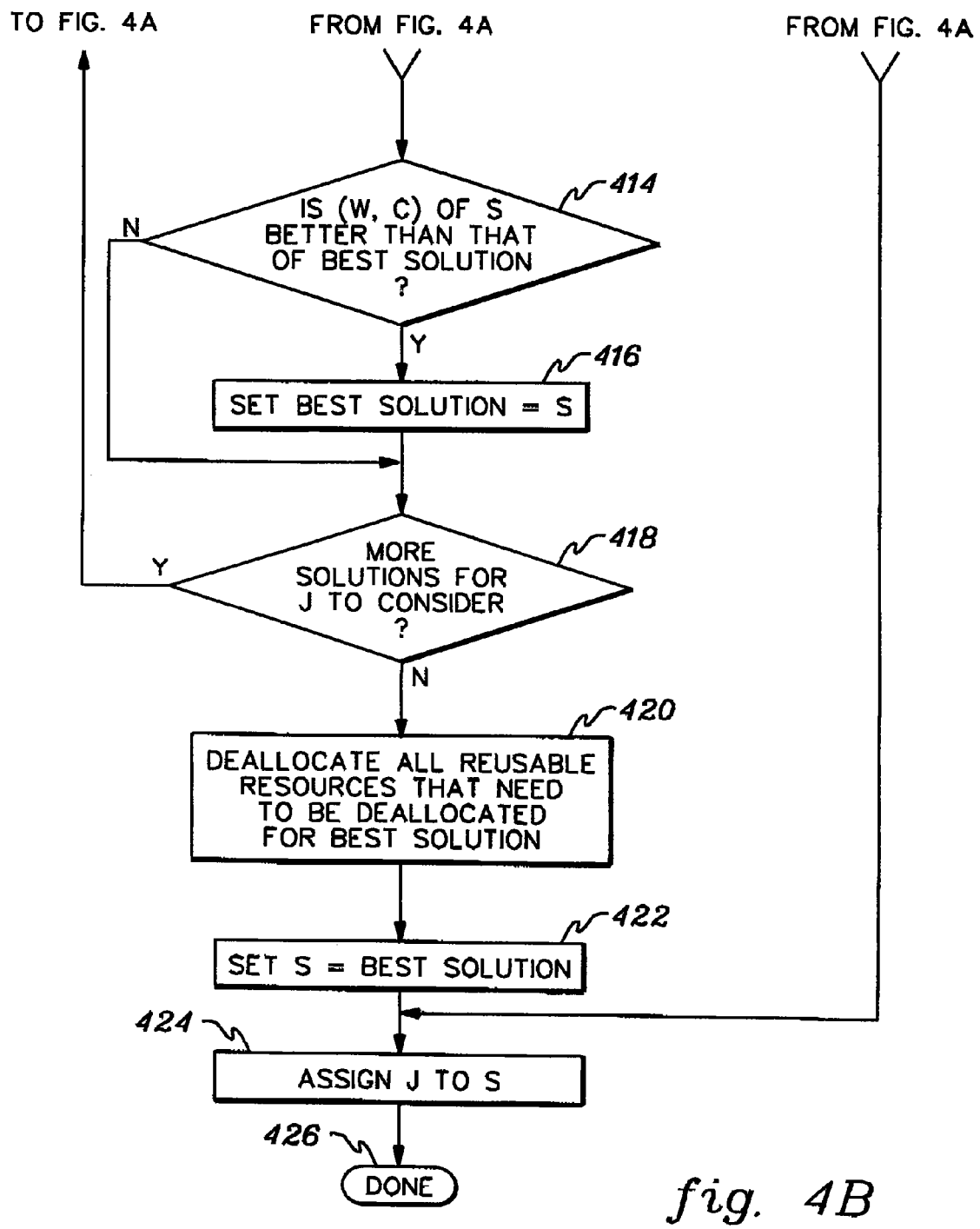

Next, a determination is made as to whether the (Sw, Sc) pair of S is a better solution than that of the best solution, INQUIRY 414 (FIG. 4B). This decision is made based on, for instance, the criteria of minimizing the number of deallocated resources and minimizing the weight. For instance, if both Sw and Sc of solution S are less than the Sw and Sc of the best solution, then solution S is the better solution. In a further example, if one of Sw and Sc is higher than one of Sw and a variable Sc of the best solution and the other of Sw and Sc of solution S is lower, then a choice is made as to which is more important. For instance, consideration is given to the following: by selecting the solution with the least weight, the start time for the job with the higher priority is minimized. By selecting the solution with the least number of resources to be deallocated, fewer deallocations/allocations are needed. This is system and/or user dependent and coded into the logic, as desired.

If S is a better solution, then the best solution is set to solution S, STEP 416, and a further decision is made as to whether there are more solutions for J to consider, INQUIRY 418. If there are more solutions, then processing continues with STEP 406 (FIG. 4A). However, if there are no further solutions to consider for J, then the reusable resources that need to be deallocated for the best solution are deallocated, STEP 420. Further, S is set equal to the best solution, STEP 422, and J is assigned to S, STEP 424. This concludes the scheduling of job J, STEP 426.

Returning to FIG. 4A and specifically INQUIRY 402, if there is a reusable resource R that can be used by J, then S is set equal to R, STEP 430, and processing continues with STEP 424 (FIG. 4B) assign J to S. Further, returning to FIG. 4A, if S does not need to deallocate a reusable resource, INQUIRY 408, processing continues with assigning J to S, STEP 424 (FIG. 4B).

Described above is a multi-phase scheduling technique in which during a first phase, weights are assigned to reusable resources of the environment based upon a predefined criteria, such as the priority of jobs which can use the corresponding resources, and during a second phase, the jobs are scheduled. If reusable resources are available for the job, the job is assigned to those resources. Otherwise, a search is performed for a solution which minimizes the weight and number of reusable resources that need to be deallocated. Reusable resources that interfere with a chosen solution are deallocated and a job is assigned to those resources.

As an example, consider a job queue with jobs J1 and J2, and two reusable resources R1 and R2. Assume J2 can reuse R1, but not R2, and J1 cannot use either R1 or R2. Also, assume there are not enough resources for J1, unless R1 or R2 are deallocated. In this scenario, when scheduling J1, it is preferable to deallocate R2 and not R1, since J2 can reuse R1.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 5:
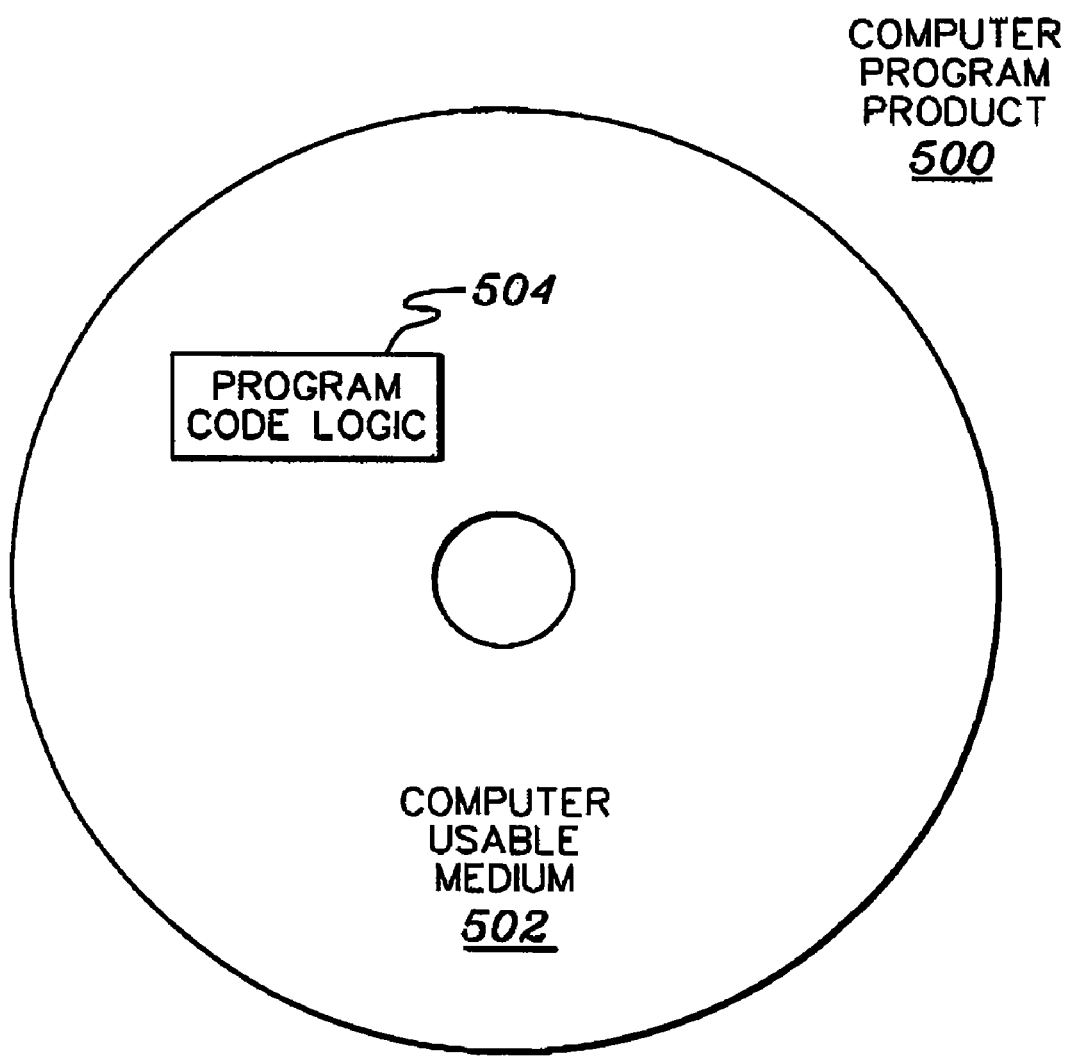
FIG. 5 depicts one embodiment of a computer program product incorporating one or more aspects of the present invention.

One example of an article of manufacture or a computer program product incorporating one or more aspects of the present invention is described with reference to FIG. 5. A computer program product 500 includes, for instance, one or more computer usable media 502 to store computer readable program code means or logic 504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a scheduling technique is provided that maximizes use of reusable resources and minimizes resource allocation costs. The technique automatically selects a set of resources to be deallocated, such that resource reuse is maximized and the time to start highest priority jobs is minimized. This decreases cost by incurring the cost of reuse over the cost of allocation/deallocation of resources.

Although various embodiments are described above, these are only examples. For example, an environment other than Blue Gene, including other massively parallel processing environments and other environments, including non-massively parallel environments, may incorporate and use one or more aspects of the present invention. Further, although in the embodiments herein, the weights being assigned to the reusable resources are integer weights, in other embodiments they may be other than integers. Moreover, the weights may be assigned based on other criteria and not necessarily based on job priority. Additionally, the resources may be other than compute nodes. This technique may be used with any types of resources to be assigned or scheduled. Further, the term "job" is not meant to be limiting in any way. It includes anything that can be scheduled. Many other variations may be made without departing from the spirit of the present invention.

Moreover, an environment that incorporates one or more aspects of the present invention may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method of scheduling jobs in a processing environment, said method comprising:
    assigning a plurality of weights to a plurality of reusable resources, wherein the assigning of a weight to a reusable resource is based upon a selected criteria;
    determining whether one or more reusable resources of the plurality of reusable resources usable in scheduling a selected job are available for the selected job;
    assigning the selected job to the one or more reusable resources, in response to the determining indicating the one or more reusable resources are available for the selected job; and
    deallocating, in response to the determining indicating unavailability, at least one reusable resource of the plurality of reusable resources to provide the one or more reusable resources usable in scheduling the selected job, wherein the deallocating comprises selecting the at least one reusable resource to be deallocated from the plurality of reusable resources based on a consideration of one or more assigned weights of one or more reusable resources and minimizing how many reusable resources are to be deallocated.

2. The computer implemented method of claim 1, wherein the selected criteria comprises priority of one or more jobs capable of using the reusable resource to which the weight is assigned.

3. The computer implemented method of claim 2, wherein the higher the priority of a job that can use the reusable resource to be assigned the weight, the higher the weight assigned to that reusable resource.

4. The computer implemented method of claim 1, wherein the deallocating comprises selecting the at least one reusable resource to be deallocated to maximize resource reuse and minimize start time of highest priority jobs.

5. The computer implemented method of claim 1, further comprising, in response to the determining indicating unavailability:
    finding one or more solutions for scheduling the selected job, wherein each solution includes an indication of one or more reusable resources to be assigned to the selected job;
    choosing a best solution from the one or more solutions, wherein the best solution includes the at least one reusable resource to be deallocated; and
    assigning the selected job to the chosen solution, in response to deallocating the at least one reusable resource.

6. The computer implemented method of claim 5, further comprising for each solution of the one or more solutions:
    deciding whether the solution requires a deallocation of one or more reusable resources;
    setting a weight variable to a maximum weight of the one or more reusable resources of the solution requiring deallocation, in response to the deciding indicating deallocation is required; and
    setting a count variable to indicate how many reusable resources of the solution requires deallocation, in response to the deciding indicating deallocation is required.

7. The computer implemented method of claim 6, wherein the choosing the best solution comprises employing the weight variable and the count variable in choosing the best solution.

8. The computer implemented method of claim 6, wherein a plurality of solutions are found, and the choosing comprises comparing the weight variable and the count variable of multiple solutions of the plurality of solutions to choose the best solution.

9. The computer implemented method of claim 8, wherein the best solution is the solution with one or more of a minimum weight variable and a minimum count variable.

10. The computer implemented method of claim 1, wherein the assigning comprises:
    choosing a job to be scheduled;
    determining whether the chosen job can be started in a reusable resource;
    incrementing a variable max, in response to the determining indicating the chosen job can be started in the reusable resource, wherein the variable max is a total number of jobs preassigned to use reusable resources;
    setting a weight of the reusable resource to the variable max, in response to the determining indicating the job can be started in the reusable resource; and
    repeating the choosing, determining, incrementing and setting should there be one or more other jobs to be scheduled.

11. The computer implemented method of claim 10, wherein the assigning further comprises:
    selecting a reusable resource from one or more reusable resources;
    re-setting the weight of the reusable resource, the reset weight being the weight to be used in scheduling; and
    repeating the selecting and re-setting for one or more reusable resources, if any.

12. The computer implemented method of claim 11, wherein the re-setting for a reusable resource comprises:
    determining whether the weight of the reusable resource is zero;
    setting the weight of the reusable resource to a selected value, in response to the determining indicating a zero value; and
    setting the weight to max+2−the weight of the reusable resource, in response to the determining indicating a non-zero value.

13. A computer system for scheduling jobs in a processing environment, said system comprising:
    a memory; and
    a processor in communications with the memory to perform a method, the method comprising:

assigning a plurality of weights to a plurality of reusable resources, wherein the assigning of a weight to a reusable resource is based upon a selected criteria;

determining whether one or more reusable resources of the plurality of reusable resources usable in scheduling a selected job are available for the selected job;

assigning the selected job to the one or more reusable resources, in response to the determining indicating the one or more reusable resources are available for the selected job; and deallocating, in response to the determining indicating unavailability, at least one reusable resource of the plurality of reusable resources to provide the one or more reusable resources usable in scheduling the selected job, wherein the deallocating comprises selecting the at least one reusable resource to be deallocated from the plurality of reusable resources based on a consideration of one or more assigned weights of one or more reusable resources and minimizing how many reusable resources are to be deallocated.

14. The system of claim 13, wherein the determining, assigning the selected job and deallocating are performed by a scheduler, and wherein the scheduler is further adapted, in response to the determining indicating unavailability, to:

find one or more solutions for scheduling the selected job, wherein each solution includes an indication of one or more reusable resources to be assigned to the selected job;

choose a best solution from the one or more solutions, wherein the best solution includes the at least one reusable resource to be deallocated; and assign the selected job to the chosen solution, in response to deallocating the at least one reusable resource.

15. The system of claim 14, wherein the scheduler is further adapted, for each solution of the one or more solutions, to:

decide whether the solution requires a deallocation of one or more reusable resources;

set a weight variable to a maximum weight of the one or more reusable resources of the solution requiring deallocation, in response to the deciding indicating deallocation is required;

set a count variable to indicate how many reusable resources of the solution require deallocation, in response to the deciding indicating deallocation is required; and choose the best solution by employing the weight variable and the count variable in choosing the best solution.

16. The system of claim 13, wherein the determining, assigning the selected job and deallocating are performed by a scheduler, and wherein to assign, the scheduler is adapted to:

choose a job to be scheduled;

determine whether the chosen job can be started in a reusable resource;

increment a variable max, in response to the determining indicating the chosen job can be started in the reusable resource, wherein the variable max is a total number of jobs preassigned to use reusable resources;

set a weight of the reusable resource to the variable max, in response to the determining indicating the job can be started in the reusable resource; and repeat the choosing, determining, incrementing and setting should there be one or more other jobs to be scheduled.

17. A computer program product for scheduling jobs, said computer program product comprising:

a non-transitory computer readable storage medium readable by a processor and storing instructions for execution by the processor for performing a method comprising:

assigning a plurality of weights to a plurality of reusable resources, wherein the assigning of a weight to a reusable resource is based upon a selected criteria;

determining whether one or more reusable resources of the plurality of reusable resources usable in scheduling a selected job are available for the selected job;

assigning the selected job to the one or more reusable resources, in response to the determining indicating the one or more reusable resources are available for the selected job; and deallocating, in response to the determining indicating unavailability, at least one reusable resource of the plurality of reusable resources to provide the one or more reusable resources usable in scheduling the selected job, wherein the deallocating comprises selecting the at least one reusable resource to be deallocated from the plurality of reusable resources based on a consideration of one or more assigned weights of one or more reusable resources and minimizing how many reusable resources are to be deallocated.

18. The computer program product of claim 17, wherein the method further comprises:

finding one or more solutions for scheduling the selected job, wherein each solution includes an indication of one or more reusable resources to be assigned to the selected job;

choosing a best solution from the one or more solutions, wherein the best solution includes the at least one reusable resource to be deallocated; and assigning the selected job to the chosen solution, in response to deallocating the at least one reusable resource.

19. The computer program product of claim 18, wherein the method further comprises:

deciding whether the solution requires a deallocation of one or more reusable resources;

setting a weight variable to a maximum weight of the one or more reusable resources of the solution requiring deallocation, in response to the deciding indicating deallocation is required; and setting a count variable to indicate how many reusable resources of the solution requires deallocation, in response to the deciding indicating deallocation is required, and wherein the choosing employs the weight variable and the count variable in choosing the best solution.

20. The computer program product of claim 17, wherein the assigning comprises:

choosing a job to be scheduled;

determining whether the chosen job can be started in a reusable resource;

incrementing a variable max, in response to the determining indicating the chosen job can be started in the reusable resource, wherein the variable max is a total number of jobs preassigned to use reusable resources;

setting a weight of the reusable resource to the variable max, in response to the determining indicating the job can be started in the reusable resource; and repeating the choosing, determining, incrementing and setting should there be one or more other jobs to be scheduled.

* * * * *